A. HARTMAN.
Assignor, by mesne Assignments, to S. S. WHITE.
Dental Drill.
No. 8,231. Reissued May 14, 1878.
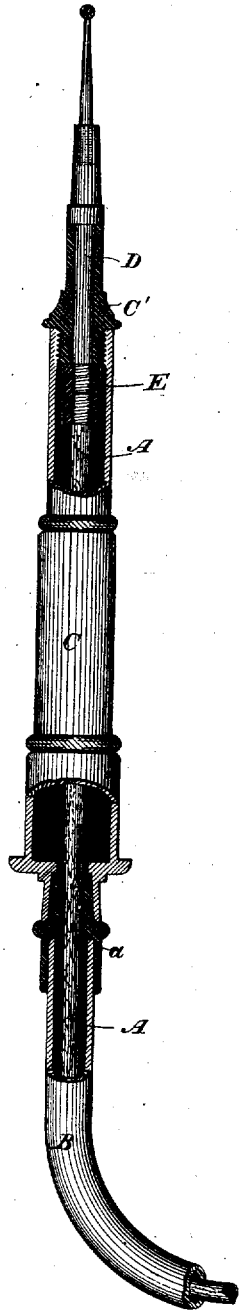
WITNESSES
Wm A Stinks
Geo W. Brick
INVENTOR
Alexander Hartman
By his Attorneys
Baldwin, Hopkins & Peyton
N. PETERS, PHOTO-LITHOGRAPHER, WASHINGTON, D. C.

UNITED STATES PATENT OFFICE.

ALEXANDER HARTMAN, OF MURFREESBOROUGH, TENNESSEE, ASSIGNOR, BY MESNE ASSIGNMENTS, TO SAMUEL S. WHITE, OF PHILADELPHIA, PENNSYLVANIA.

IMPROVEMENT IN DENTAL DRILLS.

Specification forming part of Letters Patent No. 118,237, dated August 22, 1871; Reissue No. 8,231, dated May 14, 1878; application filed May 15, 1877.

*To all whom it may concern:*

Be it known that I, ALEXANDER HARTMAN, of Murfreesborough, in the county of Rutherford and State of Tennessee, have invented certain new and useful Improvements in Dental Engines, of which the following is a specification:

My invention more especially relates to dental engines of that class in which rotary motion is imparted to a tool chuck or holder, mounted in a hand-piece or casing, through the medium of a flexible power-driven shaft, the hand-piece being carried by a flexible non-rotating sheath or cover, which envelops and protects the flexible power-driven shaft.

In all instances prior to the date of my invention in which a flexible power-driven shaft and enveloping non-rotating sheath have been directly connected to a tool-chuck and hand-piece, respectively, both shaft and sheath have been composed of stiff sections connected by flexible joints, whereby they were rendered, to a certain degree, flexible, and permitted the hand-piece carrying the operating tool to be moved in various directions. In practice, however, this construction of shaft and sheath has been found to be objectionable, as they cannot be made of that degree of lightness which it is desirable to attain while retaining their efficiency, and do not permit of that perfectly free range of movement of the hand-piece to enable the operating tool to be used in all positions with advantage, which is necessary in operations requiring such nicety as in working upon teeth in the mouth.

The object of the first part of my invention is to obviate the objections heretofore experienced with this class of engines, and to give the operating tool a wide range of movement; to which ends my improvement consists in the combination of a power-driven shaft universally flexible at every point in its length except where attached to the engine or tool-chuck, a non-rotating sheath enveloping said shaft, also universally flexible at every point in its length except where attached to the engine or hand-piece, a hand-piece or casing connected directly with said sheath at its free end, and a tool chuck or holder mounted in said hand-piece, and connected with the free end of the driving-shaft.

I am aware that power-driven shafting flexible throughout its length is old and well known, and do not claim to be the inventor of such shafting.

The object of the next part of my invention is to provide a hand-piece or casing for engines of this class which will permit of a free inspection of its interior, of the tool chuck or holder mounted therein, and of the connections between the driving-shaft and chuck.

To this end my improvement consists in a hand-piece composed of sections readily separable from each other, in which is mounted a tool-chuck, the rear section of the hand-piece and the rotary chuck being adapted to be connected with a flexible sheath and a power-driven shaft, respectively.

My invention further consists in the combination, in a dental engine, of a hand-piece or casing constructed of detachable sections, a tool chuck or holder mounted therein, and adapted for the ready interchange of operating-tools, and a flexible power-driven shaft connected with said chuck, and adapted to impart rotary motion thereto.

My invention further consists in providing the hand-piece of a dental engine with a detachable nose or sleeve, constituting one of its sections, so that when too much worn by the constant friction of the tool or chuck therein the nose may be removed and replaced by a new one, thus obviating the necessity of the substitution of an entirely new hand-piece.

My invention further consists in the peculiar manner of attaching the flexible shaft and tool-chuck.

My invention further consists of an improved flexible power-driven shaft composed of rattan.

The accompanying drawing represents a vertical elevation, partly in section, of so much of a dental engine embodying my improvements as is necessary to illustrate the subject-matter herein claimed.

A flexible shaft or cord, A, is attached at one end to, and receives rotary motion from, a suitable prime mover in the usual manner. This shaft or cord may be of any suitable material which is capable of flexing freely in all directions at every point in its length, and consists, in the present instance, of a shaft or rod of rattan, which has been found to serve a good purpose.

A flexible non-rotating sheath or tube, B, extending from the engine-frame entirely envelops and protects the power-driven shaft, which revolves freely therein. This non-rotating sheath is composed of material that will permit it to flex freely in all directions at every point in its length, consisting, in the present instance, of a rubber tube, and carries upon its free end a hand-piece or casing, C, in which is mounted a tool chuck or holder, D, to which the free end of the flexible power-driven shaft, or the end opposite the one connected with the engine, is attached, to impart rotary motion to the chuck.

It will thus be seen that the flexible shaft and sheath may be made very cheap, light, and of small diameter, and possess the capabilities of flexing freely in any and every direction in order to give the operating tool a wide range of movement, and enabling it to operate with advantage in all directions, the flexure of the shaft and sheath not interrupting the free transmission of the driving-power, which desiderata cannot be attained with stiff-jointed sections, as proposed heretofore to be used.

The hand-piece or casing I construct in sections, detachably connected together, the more readily to inspect its interior, the tool-chuck therein, and the connections between the chuck and driving-shaft, and is shown as composed of two tubular sections, C C′, the inner one of which is connected directly to the end of the flexible non-rotating sheath by means of a coupling, *a*, which permits of the separation of the hand-piece from the sheath, when desired, and affords a bearing for the flexible shaft. This inner main section may be of convenient size and length, and carries on its end the next section or nose C′ of the casing, the sections being connected together by screw-threads, so as to permit of their ready separation. In this section or nose C′ of the hand-piece the tool-chuck D has its bearing, the chuck being provided with an external annular shoulder or push-bearing, abutting against the front end of the casing or nose in such manner that, when the tool is in operation and pressure is brought to bear upon its point, no endwise movement of the holder or chuck in the casing or handle inwardly is permitted.

The inner end of the chuck or holder and the free end of the driving-shaft are connected together by a nut, E, which permits of their convenient and ready connection and separation. This nut also constitutes an internal shoulder or pull-bearing for the chuck or holder, and abuts against the inner end of the nose or sleeve C′ in such a manner that pulling strains upon the operating tool, occasioned when a draw-cut is being made, do not cause endwise outward movement or yielding of the chuck.

The operating-drills or other tools are secured in the rotary chuck or holder by any suitable means which permit of their ready insertion or removal.

I am enabled, by the construction shown and described, to remove the nose of the hand-piece or casing when worn too much and replace it by a new one, thereby obviating the necessity of an entirely new hand-piece when the bearings of the tool-chuck become worn by the excessive friction to which they are subjected.

The great advantages of my improvements will be obvious to dentists and manufacturers of dental engines.

I am aware that Greene V. Black's Patent No. 117,732, of August 8, 1871, shows a hand-piece casing composed of a single tube, in which a rotary chuck is mounted and locked against endwise movement, the tube or hand-piece being inserted in an extension of a jointed yoke and held therein by friction, within which yoke a driving-spring rotates, to impart rotary motion to the chuck; but this construction obviously differs radically from my invention, as Black's hand-piece is composed of a single tube, and has no detachable sections to permit of readily inspecting the interior of the casing or the tool-chuck and connections; whereas one of the distinguishing characteristics of my hand-piece is that it is composed of sections, one of which can be removed without disturbing the relation of the other to the flexible shaft, such removal permitting of ready inspection of the internal parts of the hand-piece and of the tool-holder and its connections.

I am also aware that a dental-engine hand-piece composed of a single tube, within which is mounted a rotary chuck, and upon which tube is mounted a supplementary angular attachment carrying an operating tool, is old, such a device being shown in the English Patent No. 529 of 1856, and also in Morrison's United States Letters Patent, dated August 16, 1870. These devices differ radically and essentially from and have no relation to my invention, and are not sectional hand-pieces in the sense in which I use that term. By the removal of the attachment no access is afforded to the chuck which receives the driving-power, nor are the interior of the hand-piece and connections of the chuck and shaft exposed, which are the results accomplished by my invention.

Having thus fully described my invention, what I claim as new, and desire to secure by Letters Patent, is—

1. The combination, substantially as hereinbefore set forth, of a power-driven shaft flexible at every point in its length, a non-rotating tube or sheath enveloping said shaft, also flexible at every point in its length, a hand piece or casing connected directly with the free end of the tube, and a tool chuck or holder mounted in said hand-piece and connected with the free end of the driving-shaft.

2. The combination, substantially as hereinbefore set forth, in a dental-engine hand-piece, of a casing constructed of detachable sections, with a rotary tool chuck or holder mounted therein, the rear section of the casing and the rotary chuck being adapted to be connected with a flexible non-rotating sheath and a flexible power-driven shaft, respectively.

3. The combination, substantially as hereinbefore set forth, in a dental engine, of a hand-piece or casing constructed of detachable sections, a tool chuck or holder mounted therein and adapted for the ready interchange of operating tools, and a flexible power-driven shaft connected with said chuck and adapted to impart rotary motion thereto.

4. A dental-engine hand-piece or casing consisting of a main body or tubular portion and a detachable section or nose, in which the tool or chuck has its bearings, whereby the nose, when worn, may be removed and a new one inserted in its place.

5. The combination, substantially as hereinbefore set forth, of the power-driven shaft, the tool chuck or holder, and a screw-nut to connect the chuck and shaft together.

6. A flexible power-driven shaft, for conveying motion, composed of rattan, as set forth.

ALEXANDER HARTMAN.

Witnesses:
I. E. DROMGOOLE,
E. D. HANCOCK.